Dec. 19, 1950 R. M. TRAVERSAC 2,534,837
AUTOMATIC CAMERA WITH CUTOFF MEANS
Filed May 24, 1948 5 Sheets-Sheet 1

INVENTOR
RENE MAURICE TRAVERSAC
By Linton and Linton
ATTORNEYS

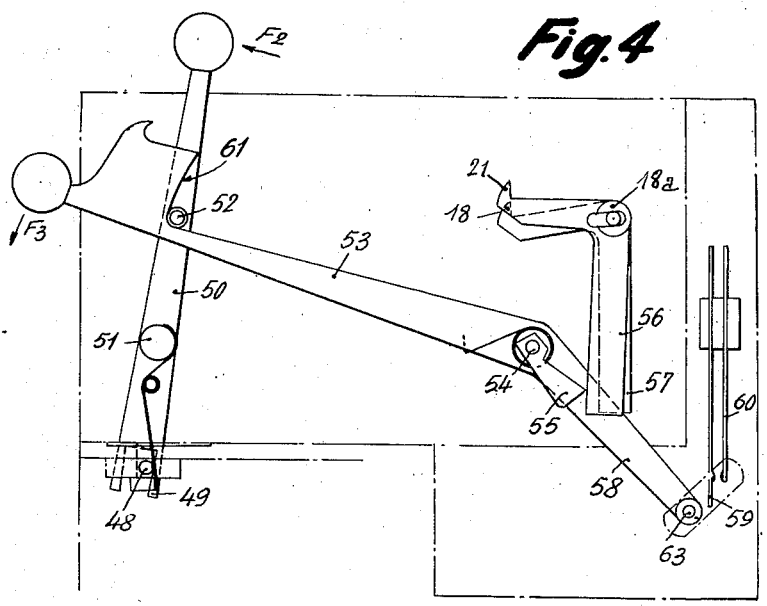
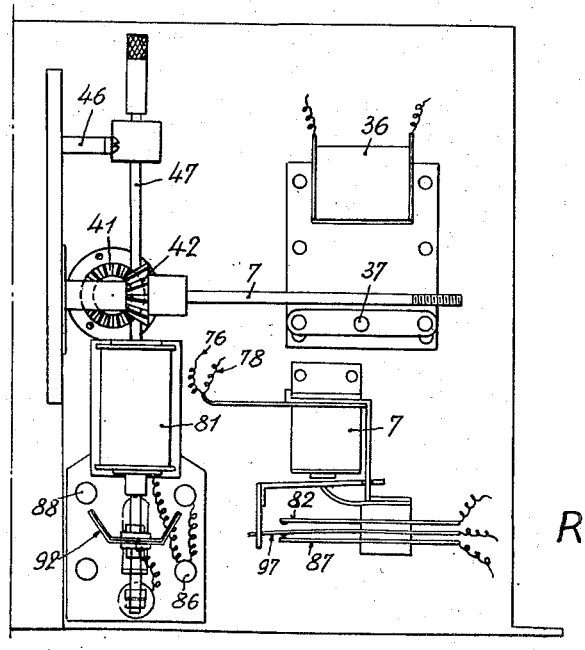

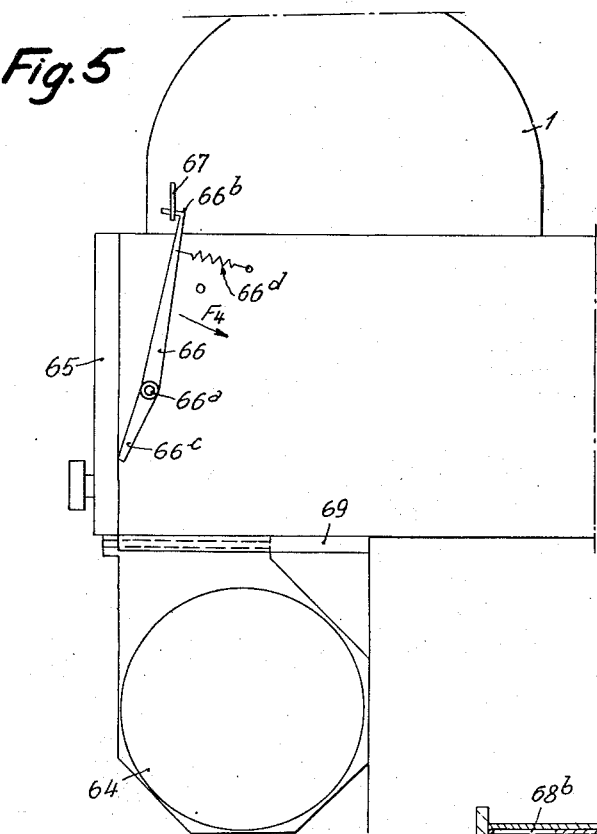
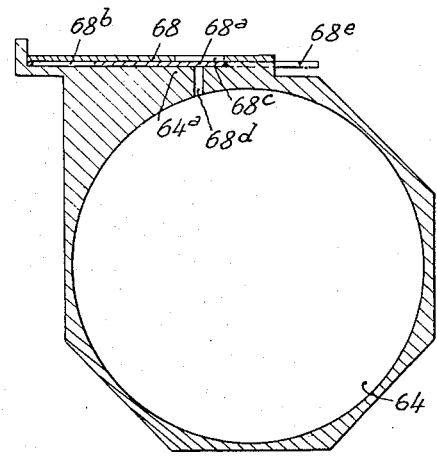

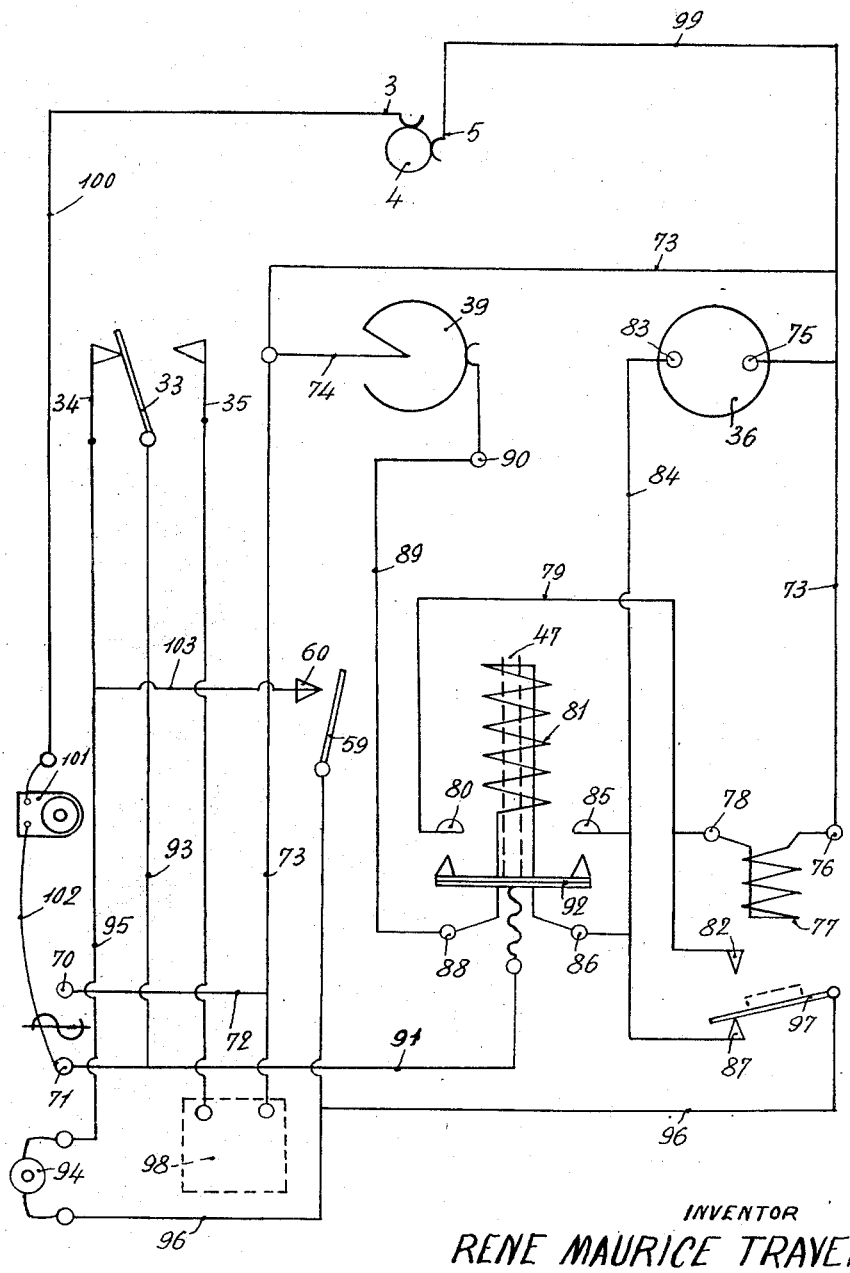

INVENTOR
RENE MAURICE TRAVERSAC
By Linton and Linton
ATTORNEYS

Patented Dec. 19, 1950

2,534,837

UNITED STATES PATENT OFFICE 2,534,837

AUTOMATIC CAMERA WITH CUTOFF MEANS

René Maurice Traversac, Paris, France, assignor to "Parmoy," Paris, France, a French limited liability company Application May 24, 1948, Serial No. 28,851
In France February 4, 1948

12 Claims. (Cl. 95—31)

My invention has for its object a photographic apparatus providing for the obtention of a successive number of photographs such as identity portraits, for instance on a film, the film strip carrying the portraits taken being cut off by a hand operated knife passing through the non impressed area following the impressed portion of the film. Furthermore, the number of photographs taken may be a predetermined one or else the taking of the pictures may be stopped by hand after a predetermined number of them has been taken, after which the cutting is performed in the manner disclosed.

According to an important feature of my invention, safety means are provided for preventing the cutting being executed before the negative film has advanced by a small amount beyond the end of the last photograph taken.

Other features of the invention will be set forth in the following description, with reference to the accompanying drawings given by way of non limitative examples; in which:

Fig. 3 is a rear view of the camera shown in Figs. 1 and 2;

Fig. 4 is a lateral view of the film cutting and simultaneously zero resetting device, said view being taken from the side opposed to Fig. 1 with the parts that have no direct action on the cutting device amitted for sake of clarity;

Fig. 5 is a partial view;

Fig. 6 is a section of the printed film take-up casing; and

Fig. 7 shows the electric diagram of the embodiment of Figs. 1 to 5.

Figure 1:
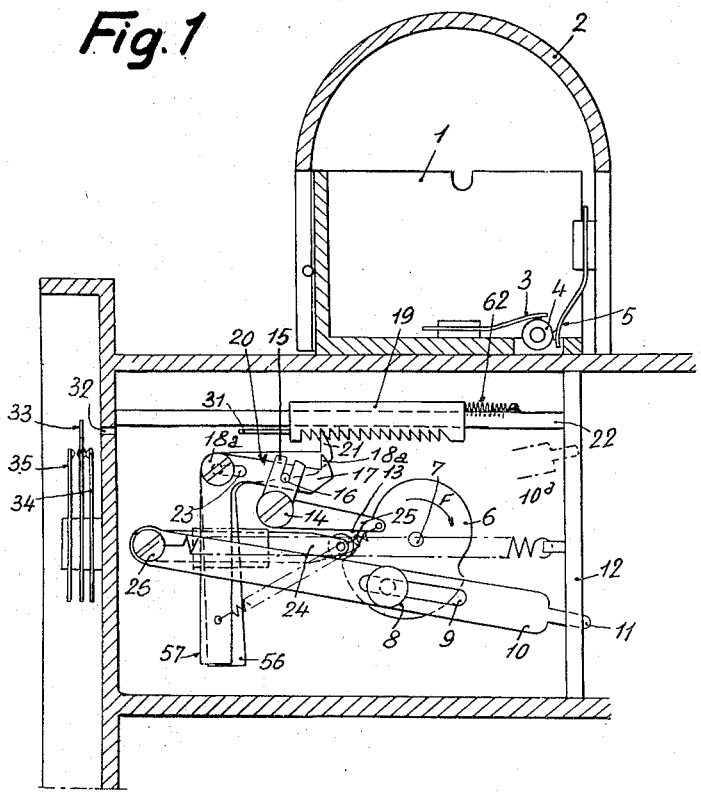
Fig. 1 is a lateral view, with the cover removed, of a camera according to the invention.

In the embodiment shown in the drawing, the fresh film is stored in the upper take-up casing 1 provided with a cover 2. When coming out, it passes between the live electric contact 3 and the contacting roller 4 upon which is pressed the electric contact 5, the said device providing for the contact to be closed over an alarm under certain circumstances as will be disclosed hereinafter when the film is no longer fed into the take-up casing or when short slots defining the different pictures on the film allow the passage of current between 3 and 4.

The part of the mechanism shown in said Figure 1 provides the drive of the film picture after picture synchronously with the displacement of the shutter of the objective.

The essential element of said mechanism is constituted by the cam 6 keyed upon the shaft 7, which is driven in a manner that will be further described.

Upon said cam is mounted a stud 8 inserting into the slit 9 of a lever 10.

The end 11 of said lever may move in a slot provided in the wall 12 of the casing of the camera, and the cam secures a displacement of the said projection 11 in order to bring it back again towards the left, when it is in its lowest position, bring it up in the position 10a, then displace it towards the right in order to insert the end 11 in the film slot (this part of motion being accomplished while the objective is uncovered) and bring the said lever back to the position 10a for driving the film of the length of a picture towards the bottom, the said operation being effected after the closure of the objective.

During the displacement just described, the stud 8 is acting upon the end 13 of a crank lever capable of oscillating at 14 upon the casing of the camera. The other end of said lever is ended by a fork 15 in which is inserted a stud 16 carried by the arm 17 of a crank lever linked at 18a on the casing of the camera. The said arm 17 is ended by a tooth 18 capable of cooperating with the rack 19. Upon the same axis is also linked a crank lever having its arm 20 also ended by a tooth 21 cooperating with the same rack. The said rack is freely displaceable upon the rod 22, but is urged towards the right by an antagonistic spring 62.

During the reascending motion, the stud 8 bears upon the tail 13, thus bringing the tooth 18a towards left, the said operation being possible since the lever 17 is mounted upon the axis 18 through an eyelet 23. The rack is then pushed towards left of the length of a tooth and is locked in such position by the second tooth 21 of the second lever.

At that time, the tail 13 escapes to the action of the stud 8; the action of the mechanism that has just been described is consequently to bring the rack towards left of the value of a tooth for each picture being impressed.

As shown in the drawing, the rod 10 is displaced under the action of a rod 24 adapted to slide longitudinally in a stationary slideway shown in interrupted lines and provided at its end with a roller 25 bearing upon the edge of said cam, said rod 24 being linked at 26 to the lever 10. The pivot 26 or a suitable point of the rod 24 is urged towards the right hand side of Fig. 1 by a spring secured to the casing and urging consequently the rod 24 towards the right so that the cam follower or roller 25 may always bear against the cam 6. In this way, as the cam is revolving in the direction of the arrow F, the rod 24 is first of all pushed back, bringing back towards left the lever 10, which is then driven upwards by the stud 8, for accomplishing the above described motion.

When the number of pictures which is to be impressed upon a length of film has reached a value which corresponds to the number of teeth of the rack 13, the latter is brought completely at the left of the drawing, and its tail 31 passing through the opening 32 of the casing is bearing upon the blade 33, in order to push it towards left.

Whilst in normal operation the contact is established between both blades 33 and 34, it is now established between the blades 33 and 35, which, as will be seen later on, has for its effect to cut out the current on the motor and operate a signal of end of operation.

Figure 2:
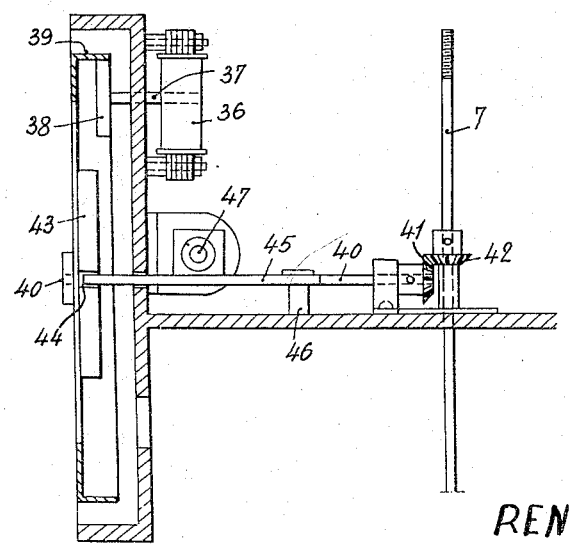
Fig. 2 is a partial top view of the said camera.
Figure 8:
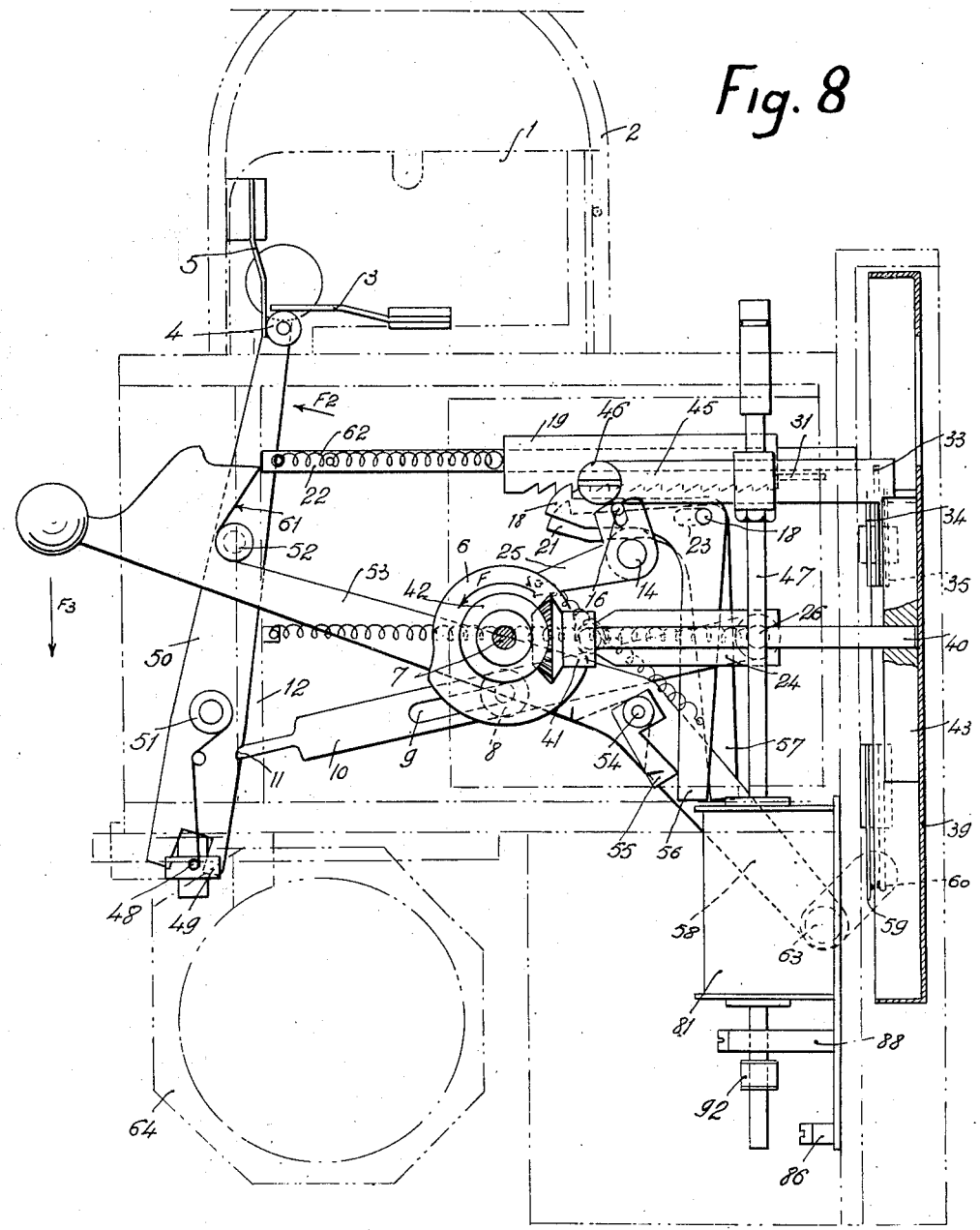
Fig. 8 is a side elevation of a camera according to the invention showing the drive for the film which is assembled to the film casing indicated by dotted lines.

The motion of the cam 6 is obtained from the motor 36 (Figs. 2 and 3) on the axis of which is keyed a friction roller 38, bearing in order to drive it upon the edge 39 of the shutter. The latter is keyed on a shaft 40 at the end of which is mounted a bevel pinion 41 meshing with a second bevel pinion 42 keyed on the shaft 7.

It is advisable to stop immediately the motion of the shutter when it has performed a complete revolution corresponding to the above described sequence of motions. Said shutter is electrically conductive throughout its periphery except at one point for which it is insulating so as to cut off the current passing through the shutter and through a relay associated therewith 81 (Figs. 3 and 7) when a picture has been taken and the shutter has returned to its starting position.

Furthermore, a disk 43 is rendered integral of said shutter, said disk carrying at its periphery, a radial slot 44 in which may insert the end of a lever 45 pivoted about the axis 46 integral of the casing of the camera.

At the moment of the taking of a picture, the lever 45 releases transiently the disc 43 and thereby the shutter through the operation of the rod 47 controlled by the relay 81 that is energized at the moment the shutter begins revolving and remains energized throughout the operative revolution of said shutter. It is thus apparent that the shutter, which is of standard type used in cameras, moves freely during the taking of a photograph.

When the desired number of pictures has been taken, it is necessary to be able to cut the film and to make this cutting in such a way that the last picture being taken be introduced in the take-up casing, the cutting taking place in the middle of the subsequent picture, for preserving the strips of film which are necessary to its manipulations. The usual cutting knife is, to this end, operated by means of a stud 48 which inserts into the fork-shaped end 49 of a lever 50 pivoted at 51 on the lateral face of the casing.

The said lever is itself provided with a stud 52 which may cooperate with a second lever 53 pivoted at 54 on the same lateral face of the casing. Upon the axis 54 is keyed a cam 55 which is displaced at the same time as the lever 53, and which acts upon the tails 56, 57 of the crank levers which are coacting with the rack 19 (Fig. 1).

Finally, the second arm 58 of the lever 53 is able to act upon the blade 59 of an electric contact comprising a second blade 60. The said levers 50 and 53 operate in the following way:

The lever 50 is to be displaced in the direction of the arrow F2 in order to secure the cutting of the film, and, as shown in the drawing, it is prevented from it by a projection 61 of the lever 53. It is consequently necessary to lower the said lever 53 in the direction of the arrow F3 in order to give freedom to the lever 50. The said manipulation of the lever consequently has the following effects:

First of all, the cam 55 comes into action upon the tails 56, 57 of the crank levers to disengage the teeth 21 and 18 from the rack which is brought to its starting position by means of the spring 62.

Furthermore, the finger 63 carried by the end 58 of the lever 53 puts in contact the two blades 59, 60 causing, as will be subsequently explained, the momentaneous starting of the motor performing unrolling of the film.

The lowering of the lever 53 brings the projection 61 beneath the finger 52, and the film may then be cut by displacing the lever 50 in the direction of the arrow F2, the operation of the motor having for previous effect to transfer the last picture thus taken in the impressed film take-up casing. It is necessary at this time to operate the said cutting lever, in order to be able to displace once more the other lever.

It is noted that this manipulation may be effected either when is obtained the number of pictures determined by the number of teeth of the rack, or at any moment, the rack being automatically brought back to its starting position at each operation. Consequently, it is always possible to take the maximum of views foreseen for a series, even after cutting a partial series.

Fig. 5 shows a partial lateral view of the device according to the invention and showing the take-up casings for the unimpressed film 1 and for the impressed film 64. It is advantageous to subordinate the possibility of opening the take-up casing 1 to the opening of the rear door 65, since opening of the said casing 1 is to be forbidden as long as the door 65 is in closing position, and as shown in the drawing. To that end, may be used a lever 66 pivoted at 66a and having its upper end provided with a hook 66b.

In the position shown, the opposed end 66c of the lever 66 bears against the door 65.

In such position, the hook 66b inserts into the ring 67 impeding any opening of the take-up casing 1. On the contrary, when the door 65 is open, the lever 66 is able to pivot in the direction of the arrow F4, the said operation being, for instance, facilitated by the spring 66d.

The film that has been impressed is received in the take-up casing 64 which is more fully shown in Fig. 6.

In order to secure the automatic tightness of the said casing, when it is removed from the camera, is advantageously provided, between the upper cover 68 and the upper surface 64a of the said casing, a shutter 68a which a plate spring 68b permanently displaces towards the right of the drawing. The slit 68c of the cover 68 and 68d of the casing are consequently separated by the shutter 68a in normal position. The said shutter comprises at both sides of the casing 64 the extensions 68e which, when the casing is arranged in the camera, come in contact with the stop 69 of the casing of the camera, thus pushing back the shutter towards left against the spring and enabling the film to enter into the take-up casing 64.

It will be noted that this take-up casing does not comprise any core for the formation of a reel and consequently, does not require a take-up tip. The film will roll by itself within the said casing.

Fig. 7 shows the electric circuit for the drive and control of the camera just described.

The current is supplied to the intake terminals 70 and 71. The terminal 70 is connected, through the wires 72 and 73, to the contact 74 carried by the shutter 39, to the terminal 75 of the motor 36 and to the terminal 76 of the electro-magnet 77.

The terminal 78 of the latter is connected through the wire 79 to the contact 80 associated to the electromagnet 81, on the one hand and to the contact 82 on the other hand. Furthermore, the second terminal 83 of the motor is connected, through the wires 84 to the second contact 85 associated to the electro-magnet 81, to the intake terminal 86 of the coil of the latter, and to the contact 87 associated with the contact 82.

The second contact 88 of the coil 81 is connected through the wire 89 to the second contact 90 associated with the shutter 39.

Finally the intake terminal 71 is connected through the wire 91 to the strip 92 associated to the electromagnet 81 and integral of the rod 47, and through the wire 93, to the movable contact 33, the contact 34 being connected to the control knob 94 by means of the wire 95; the said knob is in its turn, connected through the conductor 96 to the contact 97 movable between the contacts 82 and 87 under the dependance of the coil 77.

Furthermore, a vibrator 98 is inserted between the contacts 35 and 74, and the above described assembly 3, 4, 5, in series with a bell 99, is connected between the wire 73 and the intake terminal 71.

The elements just described are shown in the drawing in the starting position.

When, in order to take a photograph, the user presses the knob 94, the circuit is established through the elements 71, 93, 33, 34, 95, 94, 96, 97, 87, 84, 83, the motor 36, 75, 73, 72 and 70.

The said first phase, called starting phase, secures the starting of the motor.

At the same time, the current is supplied from the wire 84 to the contact 86 of the coil 81, flows in said coil, in the contact 88, wire 89, contact 90, disk 39, and gets to the wire 73 through the wire 74. The strip 92 is then attracted.

In the second phase, or running phase, which is then beginning, the circuit is established through 71, 91, 92, 85, 84, 83, 75, 73, 72 and 70. The motor is thus fed independently from the knob 94, and it continues to revolve, whether the user did or did not interrupt the pressure upon the said knob 94.

Simultaneously, the coil 81 is still energized through 84, 86, 88, 89, 90, 39 and 74. Furthermore, the coil 77 is energized through 91, 92, 80, 79, 78, 77, 76 and 73. The strip 97 then comes in contact with 82.

When, owing to the revolution of the disk 39, the contact 90 is passing on the insulating portion, the circuit is interrupted between 88, 90, on the one hand and 74, on the other hand.

The current is thus cut-out, in the coil 81, and the strip 92 falls down.

A cycle of operation is then accomplished and if the user has ceased to press the knob 94, the contact 97 falls again upon 87. The various elements are brought back to their starting position, shown in the drawings.

If, on account of a wrong manipulation, the user is continuing to press the knob 94, the strip 92 being fallen back and the contact 97 closing the circuit on 82, the current flows through the circuit 71, 93, 33, 34, 95, 94, 96, 97, 82, 78, 77, 76, 73, 72 and 70, it will be seen that the coil remains energized but that the motor is not any more fed.

It is thus impossible to take several successive photographs by pressing only once the knob.

On the contrary, when the user ceases to press the knob 94, the assembly is in the position shown. The circuit just described also enables to control the unrolling of the film.

Indeed, at that time, the secondary circuit, constituted by the wire 99, the contact 5, the contacting roller 4, the contact 3, the wire 100, the bell 101, and the wire 102 is live. The contact 3 rubs, as explained above, upon the slotted portion of the film. Each time that it meets one of said slots, it closes the circuit just described and consequently the bell 101 is ringing. If it be supposed that there are two slots for each picture, two "tops" will be heard advising of normal unrolling. Furthermore, the same circuit enables to advise of the lowering of the unimpressed film reel, since, at that instant, the circuit is permanently closed and, consequently, the bell is vibrating until the reel is replaced or the current cut-out.

When it is desired to cut the film before reaching the maximum number of pictures, it has been stated above that the cutting-film lever is first of all coming to close the contact 59, 60.

In this case, a circuit is formed comprising the elements 71, 93, 33, 34, 103, 60, 59, 96, 97, 87, 84, 83, 75, 73, 72, and 70. Consequently, the motor is fed independently from the knob 94 and advances the film of one picture, as described above.

Finally, when the rack has reached the end of its stroke and connects 33 to 35, the circuit is closed upon the vibrator 98, through 71, 93, 33, 35, 98, 72 and 70.

The user is advised at that time that the current is to be cut-out.

The operation of the film cutting device is again closing the contact 59, 60, as explained above.

The invention is capable of considerable modification and such changes thereto as come within the scope of the appended claims is deemed to be apart thereof.

What I claim is:

1. In a photographic camera adapted to produce a succession of pictures on a film through step by step operation, the provision of a control system comprising film advancing means for controlling the intermittent progression of the film, a shutter cooperating with the film, a motor controlling the operation of the shutter and of the film advancing means, a cutter adapted to cut the film, a catch system adapted to be controlled by the film advancing means for each taking of a picture, a member controlled by the catch system to advance step by step through a predetermined path and a circuit feeding the motor, a switch in said circuit lying in the path of the catch controlled member to be opened thereby when said member has reached the end of its path, elastic means urging the catch controlled member into its starting position, hand operated means for releasing the catch operated member at any desired moment and a further hand operated switch adapted to close the motor circuit.

2. In a photographic camera adapted to produce a succession of pictures on a film through step by step operation, the provision of a control system comprising film advancing means for controlling the intermittent progression of the film, a shutter cooperating with the film, a motor controlling the operation of the shutter and of the film advancing means, a cutter adapted to cut the film, a rack adapted to slide longitudinally, a catch and pawl system adapted to control the progression of said rack step by step in correspondence with the taking of a predetermined number of pictures, a circuit feeding the motor, a switch in said circuit lying in the path of the rack to be opened thereby when said rack has reached the end of its path, elastic means urging the rack into its starting position, hand operated means for releasing the rack at any desired moment and a further hand operated switch adapted to close the motor circuit.

3. In a photographic camera adapted to produce a succession of pictures in a film through step by step operation, the provision of a control system comprising film advancing means for controlling the intermittent progression of the film, a shutter cooperating with the film, a motor controlling the operation of the shutter and of the film advancing means, a cutter adapted to cut the film, a rack adapted to slide longitudinally, a catch and pawl system adapted to control the progression of said rack step by step in correspondence with the taking of a predetermined number of pictures, a circuit feeding the motor, a switch in said circuit lying in the path of the rack to be opened thereby when said rack has reached the end of its path, elastic means urging the rack into its starting position, a further hand operated switch adapted to close the motor circuit, a hand operated lever adapted to disengage when depressed the catch and pawl from the rack, an auxiliary switch inserted in shunt relationship with the hand operated switch and adapted to be closed by the hand operated lever when depressed and means whereby said hand operated lever, when in its inoperative undepressed position locks the cutter against operation.

4. In a photographic camera adapted to produce a succession of pictures in a film through step by step operation, the provision of a control system comprising film advancing means for controlling the intermittent progression of the film, a shutter cooperating with the film, a motor controlling the operation of the shutter and of the film advancing means, a cutter adapted to cut the film, a rack adapted to slide longitudinally, a catch and pawl system adapted to control the progression of said rack step by step in correspondence with the taking of a predetermined number of pictures, a circuit feeding the motor, a switch in said circuit lying in the path of the rack to be opened thereby when said rack has reached the end of its path, elastic means urging the rack into its starting position, a further hand operated switch adapted to close the motor circuit, a hand operated lever adapted to disengage when depressed the catch and pawl from the rack, an auxiliary switch inserted in shunt relationship with the hand operated switch and adapted to be closed by the hand operated lever when depressed, a projection on the hand operated lever and a further hand operated lever controlling the cutter and including a lateral stop normally engaging the projection on the first lever, the depression of the first lever releasing said projection and allowing operation of the second lever.

5. In a photographic camera adapted to produce a succession of pictures on a film through step by step operation, the provision of a control system comprising film advancing means for controlling the intermittent progression of the film, a shutter cooperating with the film, a motor controlling the operation of the shutter and of the film advancing means, a cutter adapted to cut the film, a catch system adapted to be controlled by the film advancing means for each taking of a picture, a member controlled by the catch system to advance step by step through a predetermined path and a circuit feeding the motor, a switch in said circuit lying in the path of the catch controlled member to be opened thereby when said member has reached the end of its path, elastic means urging the catch controlled member into its starting position, hand operated means for releasing the catch operated member at any desired moment and a further hand operated switch adapted to close the motor circuit, a relay in shunt relationship with the motor in the motor circuit, an armature controlled by said relay and adapted to keep said circuit closed when the hand operated switch is released, means whereby the shutter deenergizes said relay at the end of its operation, means normally holding the shutter against operation and a linkage controlled by the relay armature for releasing the shutter when the relay is energized.

6. In a photographic camera adapted to produce a succession of pictures on a film through step by step operation, the provision of a control system comprising film advancing means for controlling the intermittent progression of the film, a shutter cooperating with the film and provided with a conductive periphery except for one small insulating section, a motor controlling the operation of the shutter and of the film advancing means, a cutter adapted to cut the film, a catch system adapted to be controlled by the film advancing means for each taking of a picture, a member controlled by the catch system to advance step by step through a predetermined path and a circuit feeding the motor, a switch in said circuit lying in the path of the catch controlled member to be opened thereby when said member has reached the end of its path, elastic means urging the catch controlled member into its starting position, hand operated means for releasing the catch operated member at any desired moment and a further hand operated switch adapted to close the motor circuit, a relay, a shunt circuit feeding same and passing through the conductive periphery of the shutter during operation of the latter, said latter circuit being switched off through the insulating portion of the shutter periphery when the latter is in its inoperative position, an armature controlled by said relay and adapted to keep said circuit closed when the hand operated switch is released, means whereby the shutter deenergizes said relay at the end of its operation, means normally holding the shutter against operation and a linkage controlled by the relay armature for releasing the shutter when the relay is energized.

7. In a photographic camera adapted to produce a succession of pictures on a film through step by step operation, the provision of a control system comprising film advancing means for controlling the intermittent progression of the film, a shutter cooperating with the film, a motor controlling the operation of the shutter and of the film advancing means, a cutter adapted to cut the film, a catch system adapted to be controlled by the film advancing means for each taking of a picture, a member controlled by the catch system to advance step by step through a predetermined path and a circuit feeding the motor, a switch in said circuit lying in the path of the catch controlled member to be opened thereby when said member has reached the end of its path, elastic means urging the catch controlled member into its starting position, hand operated means releasing the catch operated member at any desired moment and a further hand operated switch adapted to close the motor circuit, an auxiliary switch in shunt relationship with the hand operated switch, a hand operated lever controlling the cutter, means for locking said lever against operation and means whereby operation of the hand operated means closes the auxiliary switch and releases the cutter lever from its locking means, a relay controlled by the motor circuit and adapted to keep the motor circuit energized upon release of the hand operated switch, means locking the shutter against operation and means controlled by said relay for releasing the shutter.

8. In a photographic camera adapted to produce a succession of pictures on a film through step by step operation, the provision of a control system comprising film advancing means for controlling the intermittent progression of the film, a shutter cooperating with the film, a motor controlling the operation of the shutter, means whereby the rotation of the shutter controls the operation of the film advancing means, a cutter adapted to cut the film, a catch system adapted to be controlled by the film advancing means for each taking of a picture, a member controlled by the catch system to advance step by step through a predetermined path and a circuit feeding the motor, a switch in said circuit lying in the path of the catch controlled member to be opened thereby when said member has reached the end of its path, elastic means urging the catch controlled member into its starting position, hand operated means for releasing the catch operated member at any desired moment and a further hand operated switch adapted to close the motor circuit.

9. In a photographic camera adapted to produce a succession of pictures on a film through step by step operation, the provision of a control system comprising film advancing means for controlling the intermittent progression of the film, a shutter cooperating with the film, a motor controlling the operation of the shutter, a shaft coaxially rigid with the shutter, a cam controlled by said shaft, a first rod adapted to control the intermittent movement of the film and provided with a longitudinal slot, a guiding member on the cam engaging said slot, a second rod pivotally secured to the inoperative end of the first rod, a cam follower carried by the free end of the second rod and cooperating with said cam, a stationary elongated guide constraining the second rod to remain in alignment therewith and a spring urging the second rod against the cam, a cutter adapted to cut the film, a catch system adapted to be controlled by the film advancing means for each taking of a picture, a member controlled by the catch system to advance step by step through a predetermined path and a circuit feeding the motor, a switch in said circuit lying in the path of the catch controlled member to be opened thereby when said member has reached the end of its path, elastic means urging the catch controlled member into its starting position, hand operated means for releasing the catch operated member at any desired moment and a further hand operated switch adapted to close the motor circuit.

10. In a photographic camera adapted to produce a succession of pictures on a film through step by step operation, the provision of a control system comprising film advancing means for controlling the intermittent progression of the film, a shutter cooperating with the film, a motor controlling the operation of the shutter and of the film advancing means, a cutter adapted to cut the film, a catch system adapted to be controlled by the film advancing means for each taking of a picture, a member controlled by the catch system to advance step by step through a predetermined path and a circuit feeding the motor, a switch in said circuit lying in the path of the catch controlled member to be opened thereby when said member has reached the end of its path, elastic means urging the catch controlled member into its starting position, a further hand operated switch adapted to close the motor circuit, locking means for the cutter and hand operated means adapted to simultaneously release said locking means and said catch operated member and to energize the motor circuit when the hand operated switch is inoperative.

11. In a photographic camera adapted to produce a succession of pictures on a film through step by step operation, the provision of a control system comprising film advancing means for controlling the intermittent progression of the film, a shutter cooperating with the film and provided with a conductive periphery except for one small insulating section, a motor controlling the operation of the shutter and of the film advancing means, a cutter adapted to cut the film, a catch system adapted to be controlled by the film advancing means for each taking of a picture, a member controlled by the catch system to advance step by step through a predetermined path and a circuit feeding the motor, a switch in said circuit lying in the path of the catch controlled member to be opened thereby when said member has reached the end of its path, elastic means urging the catch controlled member into its starting position, hand operated means for releasing the catch operated member at any desired moment and a further hand operated switch adapted to close the motor circuit, a relay in shunt relationship with the motor in the motor circuit, an armature controlled by said relay and adapted to keep said circuit closed when the hand operated switch is released, means normally holding the shutter against operation and a linkage controlled by the relay armature for releasing the shutter when the relay is energized, an auxiliary switch in shunt relationship with the hand operated switch, a hand operated lever controlling the cutter, means for locking said lever against operation and means whereby operation of the hand operated means closes the auxiliary switch and releases the cutter lever from its locking means, a shunt in the motor circuit passing through the shutter periphery, a relay in said shunt, an armature controlled by said relay and electrically connected with one terminal of the motor circuit, means whereby said armature when the relay is operative connects said terminal of the motor circuit with the input terminal of the motor for keeping same energized, a further shunt circuit connecting through the armature, when energized, said motor circuit terminal with the output terminal of the motor, a further relay in said last mentioned shunt circuit, a switch in the motor circuit controlled by said last mentioned relay and adapted when shifted by said relay to short circuit said motor over said last mentioned short circuit and an alarm circuit closed through the opening of the first switch.

12. In a photographic camera adapted to produce a succession of pictures on a film through step by step operation, the provision of a control system comprising film advancing means for controlling the intermittent progression of the film, a film takeup casing provided with a film entrance gate, a shutter cooperating with the film and provided with a conductive periphery except for one small insulating section, a motor controlling the operation of the shutter and of the film advancing means, a cutter adapted to cut the film, a catch system adapted to be controlled by the film advancing means for each taking of a picture, a member controlled by the catch system to advance step by step through a predetermined path and a circuit feeding the motor, a switch in said circuit lying in the path of the catch controlled member to be opened thereby when said member has reached the end of its path, elastic means urging the catch controlled member into its starting position, hand operated means for releasing the catch operated member at any desired moment and a further hand operated switch adapted to close the motor circuit, a relay in shunt relationship with the motor in the motor circuit, an armature controlled by said relay and adapted to keep said circuit closed when the hand operated switch is released, means normally holding the shutter against operation and a linkage controlled by the relay armature for releasing the shutter when the relay is energized, an auxiliary switch in shunt relationship with the hand operated switch, a hand operated lever controlling the cutter, means for locking said lever against operation and means whereby operation of the hand operated means closes the auxiliary switch and releases the cutter lever from its locking means, a shunt in the motor circuit passing through the shutter periphery, a relay in said shunt, an armature controlled by said relay and electrically connected with one terminal of the motor circuit, means whereby said armature when the relay is operative connects said terminal of the motor circuit with the input terminal of the motor for keeping same energized, a further shunt circuit connecting through the armature, when energized, said motor circuit terminal with the output terminal of the motor, a further relay in said last mentioned shunt circuit, a switch in the motor circuit controlled by said last mentioned relay and adapted when shifted by said relay to short circuit said motor over said last mentioned short circuit and an alarm circuit closed through the opening of the first switch, a further alarm circuit shunted across the motor and a switch in said last mentioned circuit controlled by the passage of the film through the gate and adapted to be closed in the absence of a film and during the passage of slotted portions of said film through said gate.

RENÉ MAURICE TRAVERSAC.

REFERENCES CITED

The following references are of record in the file of this patent:

UNITED STATES PATENTS

| Number | Name | Date |
|---|---|---|
| 1,792,025 | Morrall | Feb. 10, 1931 |
| 1,846,571 | Rochestie et al. | Feb. 23, 1932 |
| 1,873,654 | Mannick | Aug. 23, 1932 |
| 2,003,691 | Lundberg | June 4, 1935 |
| 2,125,388 | Monroe | Aug. 2, 1938 |
| 2,351,399 | Caracciolo et al. | June 13, 1944 |
| 2,380,378 | Allen | July 31, 1945 |